Feb. 19, 1952   A. G. FOOTE   2,586,319
ELECTRIC DEVICE CONTINUITY TESTER
Filed Feb. 24, 1948
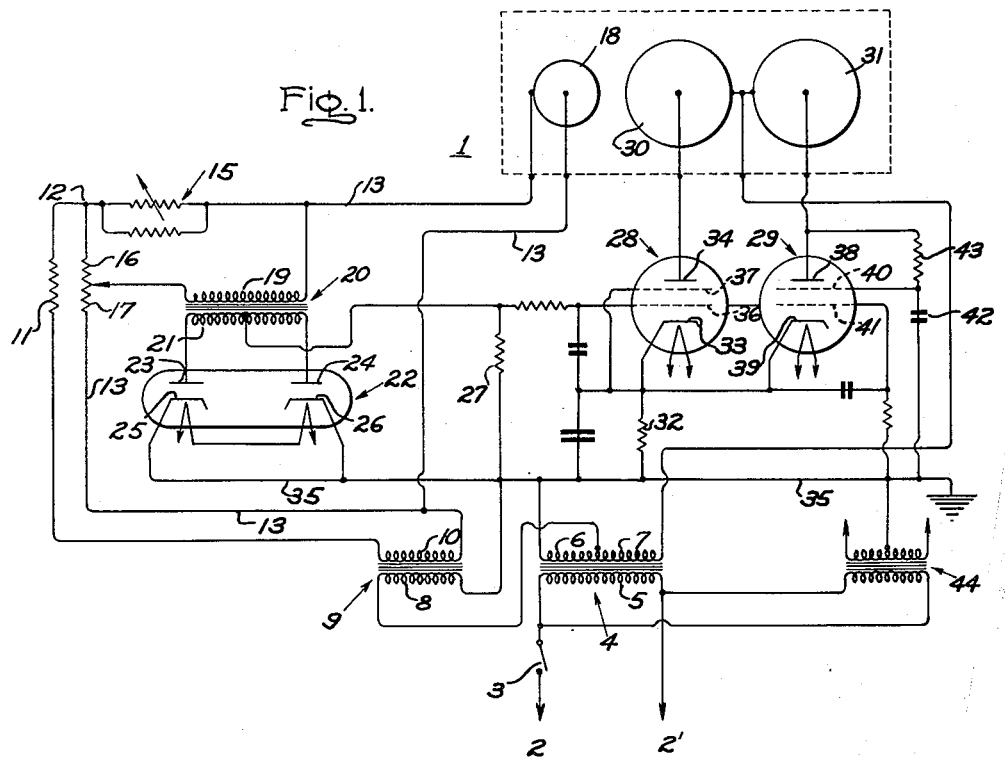
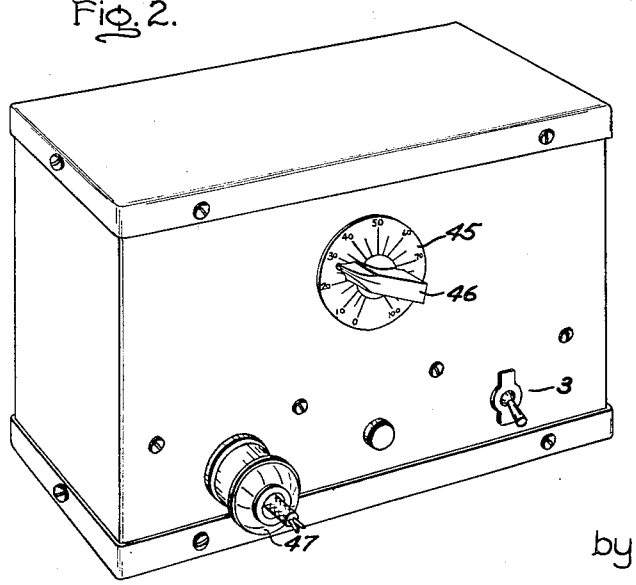
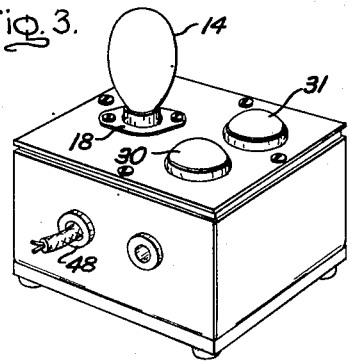
Inventor:
Alton G. Foote,
by Vernet C. Kauffman
His Attorney Patented Feb. 19, 1952

2,586,319

UNITED STATES PATENT OFFICE 2,586,319

ELECTRIC DEVICE CONTINUITY TESTER

Alton G. Foote, Wickliffe, Ohio, assignor to General Electric Company, a corporation of New York Application February 24, 1948, Serial No. 10,355

4 Claims. (Cl. 175—183)

This invention relates generally to the testing of electrical elements for resistance and continuity and more particularly to testing apparatus for indicating acceptance or rejection of such elements on a production basis.

An object of my invention is to provide a new and improved circuit and apparatus for testing the electrical continuity of elements of electric devices.

Another object of my invention is to provide a new and improved circuit and apparatus for testing the continuity of photoflash lamp filaments which greatly reduces the time and effort required of an operator performing the test.

A further object of my invention is to provide a new and improved continuity tester which will lend itself to operation in conjunction with automatic equipment.

Further features and advantages of my invention will appear from the following description of an embodiment thereof. For a better understanding of my invention reference may be had to the following description taken in connection with the accompanying drawing and its scope will be pointed out in the appended claims. Fig. 1 illustrates a circuit diagram incorporating my invention. Figs. 2 and 3 are perspective views of commercial equipment embodying my invention and incorporating the circuit illustrated in Fig. 1, wherein in Fig. 2 illustrates a control unit housing and Fig. 3 illustrates an indicating unit comprising a test socket and indicator lamps.

In accordance with my invention, I provide means for examining photoflash lamps for detecting shorted lead-in wires, high resistance or open-circuited filaments and similar faults. Utilization is made of a potentiometer such as a Wheatstone bridge circuit, the output voltage of which is amplified by a transformer and rectified by an electric valve means such as a bi-phase or full wave rectifier. A unidirectional output voltage proportional to the output voltage of the Wheatstone bridge is produced across a load resistance. The magnitude of the rectified voltage determines which valve of a pair of control valves conducts and energizes an associated indicating device. A phase shifting circuit associated with the second control valve delays the operation of that valve for a predetermined interval of time during each positive half cycle of applied anode-cathode voltage, thus permitting the first mentioned control valve to operate if the circuit conditions are such as to warrant it. If the first mentioned electric valve means does not operate then after the predetermined interval of time the second electric valve means operates.

To accomplish the desired results I provide a resistance responsive circuit employing a low impedance Wheatstone bridge. The use of a low impedance bridge is desirable to distinguish between a lamp having a good filament and one having a loose or insecure contact with the lead-in wires. Foil or other filamentary combustible material of the photoflash lamps, across the lead-in wires, also provides a circuit through the lamps, but the possibility of approving a poor lamp is minimized by passing the maximum allowable current through the lamp filaments while testing. The lamp to be tested is placed in a test socket which is positioned in one arm of the Wheatstone bridge. If a good lamp is placed in the test socket, the bridge is substantially balanced, the output voltage of the Wheatstone bridge circuit is small if not zero, and the potential across the load resistor is small or zero, permitting the first mentioned electric valve means to conduct and energize the indicating device associated therewith, the other or second electric valve being held-off by a biasing voltage developed by the first valve. If, however, a lamp having a shorted lead-in wire or open-circuited filament is placed in the test socket, the bridge will not balance and the negative unidirectional biasing potential appearing across the load resistance will prevent the first-mentioned electric valve means from conducting, and, after the predetermined interval of time, allow the second-mentioned electric valve means to conduct and energize the indicating device associated therewith.

Referring to Fig. 1, indicating device 1 is connected across a suitable power supply circuit 2, 2' which, for example, may be a 118 volt, 60 cycle source for supplying current to device 1. A manual make-and-break control switch 3 may be used to connect device 1 to the supply circuit. Referring more in detail to device 1, I provide a transformer 4, such as a 1-to-1 ratio transformer, comprising a primary winding 5 connected across the supply circuit 2, 2', and a center-tapped secondary winding providing winding sections 6 and 7. The center tap of the secondary winding of transformer 4 is connected in series with a primary winding 8 of a step-down transformer 9. A secondary winding 10 of the step-down transformer 9 provides an input voltage through a current-limiting resistor 11 at a point 12 to a Wheatstone bridge circuit 13. The Wheatstone bridge circuit 13 is employed for measuring the variations within certain ranges of the resistance of a filament of a photoflash lamp 14 illustrated in Fig. 3. The Wheatstone bridge circuit 13 employs three known variable resistances 15, 16 and 17 inserted in arms thereof properly proportioned as compared with the range of the resistance of a filament of the photoflash lamp 14, so that there will be little or no output voltage from the bridge under balanced conditions. A test socket 18 is provided to support a photoflash lamp the filament of which forms one part of the Wheatstone bridge circuit 13. As may be seen upon inspection of the drawing, resistor 15 provides the standard resistance for the bridge, whereas the filament of the lamp inserted in socket 18 provides the unknown resistance. Resistances 16 and 17 in turn provide the ratio arms of the bridge.

The output voltages of the Wheatstone bridge is impressed across the primary winding 19 of a step-up transformer 20 comprising a secondary winding 21. The induced voltage of the secondary winding 21 is rectified by means of a bi-phase or full wave rectifier circuit including an electric valve means, such as a rectifier 22 comprising a pair of anodes 23 and 24 and a pair of cathodes 25 and 26. The rectified voltage from rectifier 22 is impressed across a load resistance 27, and its magnitude determines which one of a pair of control valves, such as thyratrons 28 and 29, conducts current. Thyratrons 28 and 29 in turn energizes a pair of indicating devices 30 and 31 such as indicating lamps associated therewith. If thyratron 28 does conduct then thyratron 29 cannot conduct due to a biasing potential developed across a resistance 32 in series with a cathode 33 of thyratron 28. If thyratron 28 does not conduct, then after a predetermined interval of time during each positive half cycle thyratron 29 will conduct. Thyratron 28 comprises in addition an anode 34 directly connected to one terminal of indicating device 30, cathode 33 connected through resistance 32 to a common ground connection 35, a control grid 36, and a shield grid 37. The voltage impressed on grid 36 is determined by the rectified voltage developed across the load resistance 27. Thyratron 29 comprises an anode 38 associated with indicating device 31, a cathode 39, a shield grid 40 and a control grid 41. A phase shift circuit comprising a capacitance 42 and a resistance 43 in conjunction with the shield grid 40 of thyratron 29 prevents thyratron 29 from conducting earlier in the cycle than thyratron 28. Thus, if thyratron 28 does conduct, then thyratron 29 cannot conduct due to the bias voltage developed across resistance 32 in series with cathode 33 of thyratron 28. A filamentary heating transformer 44 connected across the source of power 2, 2' supplies the proper filamentary electrode or heater voltages for the rectifier 22 and thyratrons 28 and 29.

When the entire installation is energized by closing switch 3 and a photoflash test lamp is inserted in socket 18, the operation of the indicator circuit is as follows: a voltage is applied across the input pair of conjugate points of the Wheatstone bridge 13 by means of transformer 9. If Wheatstone bridge 13 is unbalanced in either direction, that is, if a photoflash test lamp 14 having a shorted-filament or open-circuited filament is inserted in test socket 18, an alternating signal voltage is developed between the output pair of conjugate points of the bridge, which signal is amplified by transformer 20 connected across these points. This stepped-up signal is then rectified by the rectifier circuit which impresses a negative bias voltage on control grid 36 of thyratron 28 and prevents it from conducting when its plate or anode 34 goes positive. If thyratron 28 does not conduct current, thyraton 29 will conduct current at a later instant in the alternating current cycle and thereby energize illuminating signal or indicating device 31. Device 31 may be a red signal lamp indicating a defective photoflash lamp in the test socket 18. With a small signal or no signal input, as occurs when the Wheatstone bridge is balanced with a photoflash lamp having the desired resistance in its filamentary circuit, thyratron 28 will conduct current when its anode goes positive, since the voltage developed across resistance 27 is small or zero in value. Thyratron 28 will transmit through indicating device 30, which may be a green signal lamp. The flow of current through thyratron 28 will in turn produce a voltage drop across resistance 32 so that thyratron 29 will not conduct. The phase shift network including resistance 43 and capacitance 42, in conjunction with the shield grid 40 of thyratron 29, prevents thyratron 29 from conducting earlier in the cycle than thyratron 28. Thus, if thyratron 28 does conduct, then thyratron 29 cannot conduct due to the bias developed across resistance 32. By this means a red signal is indicated at all times when the circuit is energized with or without a faulty lamp in the test socket. Thus, the indicating device 1 is continuously self-checking since the green glow lamp 30 lights only with a good photoflash lamp in position. At all other times the red lamp 31 is conducting current. If the green lamp conducts current continuously, the device is inoperative and must be repaired.

Adjustment of indicating device 1 for testing different size filaments or types of lamps may be accomplished by variations of the arms of the Wheatstone bridge including resistances 15, 16 and 17.

Figs. 2 and 3 are perspective views of a commercial equipment embodying my invention and incorporating the circuit illustrated in Fig. 1. A dial 45 and knob 46 make possible a variation of resistance of the variable resistance 15. A cable connection 47 and 48 connect the control housing illustrated in Fig. 2 with the unit illustrated in Fig. 3 which houses the test socket 18 and signal lamps 30 and 31.

In accordance with my invention I provide a new and improved device for visually checking the continuity of photoflash lamp filaments and automatically indicating good or defective photoflash lamps, while at the same time continuously self-checking its operating constituent parts.

Generally speaking, the apparatus is adjustable to all sizes of filaments and all types of lamps for production testing of photoflash lamp filaments. In addition, the apparatus may readily be adapted to automatic machinery for high-speed production testing by using suitable relays in place of the visual signal lamps.

While a certain specific embodiment has been shown and described, it will, of course, be understood that various modifications may be made without departing from the invention. Moreover, while the apparatus has been described in conjunction with its specific use for measuring the filament continuity of photoflash lamps, it is evidently not restricted to such a use. The appended claims are, therefore, intended to cover any such modifications coming within the true spirit and scope of the invention.

What I claim as new and desire to secure by Letters Patent of the United States is:

1. Testing apparatus for indicating the acceptability of electrical elements on the basis of limited deviation from a predetermined impedance, comprising a Wheatstone bridge having four impedance arms symmetrically disposed between two pairs of conjugate points, three of said arms having known values, and the fourth consisting of terminals for receiving one of said elements, means for applying an alternating voltage across one of said pairs, a rectifying system connected across the other of said pairs for developing a unidirectional output voltage of negative polarity proportional to said deviation, a pair of electron discharge tubes each having an anode, a cathode, and a control electrode, operating circuits for said tubes comprising individual indicating devices connected in series with their respective anodes to one side of a source of alternating voltage, and a single impedance connecting said cathodes in common to the other side of said source, a connection for applying said output voltage to one of said control electrodes, and a phase shift network for applying a phase retarded alternating voltage to the other of said control electrodes.

2. Testing apparatus for indicating the acceptability of electrical elements on the basis of limited deviation from a predetermined impedance, comprising a Wheatstone bridge having four impedance arms symmetrically disposed between two pairs of conjugate points, three of said arms having known values, and the fourth consisting of terminals for receiving one of said elements, means for applying an alternating voltage across one of said pairs, a rectifying system connected across the other of said pairs for developing a unidirectional output voltage of negative polarity proportional to said deviation, a pair of thyratron tubes each having an anode, a cathode, and a control electrode, operating circuits for said tubes comprising individual indicating devices connected in series with their respective anodes to one side of a source of alternating voltage, and an impedance connecting said cathodes in common with the other side of said source, said common cathode impedance serving to develop a bias potential for preventing one of said tubes from ionizing and conducting when the other has started to conduct, connections for applying said output voltage to one of said control electrodes, and a phase shift network for applying a phase retarded alternating voltage to the other of said control electrodes.

3. Testing aparatus for indicating the acceptability of electrical elements on the basis of limited deviation from a predetermined impedance, comprising a Wheatstone bridge having four impedance arms symmetrically disposed between two pairs of conjugate points, three of said arms having known values and the fourth consisting of terminals for receiving one of said elements, means for applying an alternating voltage across one of said pairs, a full wave rectifying system connected across the other of said pairs for developing a unidirectional output voltage of negative polarity proportional to said deviation, a pair of thyratron tubes each having an anode, a cathode, and a control electrode, operating circuits for said tubes comprising individual indicating devices connected in series with their respective anodes to the one side of a source of alternating voltage, and an impedance connecting said cathodes in common to the other side of said source, said common impedance serving to develop a bias potential upon conduction in one of said tubes to prevent the other from conducting, connections for applying said output voltage between the other side of said source and the control electrode from one of said tubes, said one tube thereby being permitted to strike and conduct only when said negative output voltage is less than a predetermined value, a phase shift network for applying a phase retarded alternating voltage to the control electrode of the other of said tubes, said phase retarded voltage thereby permitting said other tube to strike and conduct during a later portion of an alternating current cycle in the event of failure of said one tube to conduct.

4. Testing apparatus for indicating the acceptability of electrical elements on the basis of limited deviation from a predetermined impedance, comprising a Wheatstone bridge having four impedance arms symmetrically disposed between two pairs of conjugate points, three of said arms having known values and the fourth consisting of terminals for receiving one of said elements, means for applying alternating voltage across one of said pairs, a rectifying system for developing a unidirectional output voltage of negative polarity proportional to said deviation, said system comprising a twin anode rectifying tube whereof the anodes are energized from opposite sides of a winding inductively connected across the other of said pairs, and whereof the output voltage is developed across a resistor connected between a center tap in said winding and a cathode common to both said anodes, a pair of thyratron tubes each having an anode, a cathode, and a control electrode, operating circuits for said tubes comprising individual indicating devices connected in series with their respective anodes to the one side of a source of alternating voltage, and an impedance connecting said cathodes in common to the other side of said source, said common impedance serving to develop a bias potential upon conduction in one of said tubes to prevent the other from conducting, connections for applying said output voltage between the other side of said source and the control electrode of one of said tubes, said one tube thereby being permitted to strike and conduct only when said negative output voltage is less than a predetermined value, a phase shift network for applying a phase retarded alternating voltage to the control electrode of the other of said tubes, said phase retarded voltage thereby permitting said other tube to strike and conduct during a later portion of an alternating current cycle in the event of failure of said one tube to conduct.

ALTON G. FOOTE.

REFERENCES CITED

The following references are of record in the file of this patent:

UNITED STATES PATENTS

| Number | Country | Date |
|---|---|---|
| 2,158,871 | Jacobsen | May 16, 1939 |
| 2,197,414 | Place | Apr. 16, 1940 |
| 2,350,888 | Hall | June 6, 1944 |
| 2,474,692 | Rossoff | June 28, 1949 |

OTHER REFERENCES

Publication "Electronics in Resistor Manufacturing" by Podolsky in Electronics, July 1933, pages 180–181.